United States Patent
Minko

(10) Patent No.: US 10,079,435 B1
(45) Date of Patent: Sep. 18, 2018

(54) REFLECTOR

(75) Inventor: Glenn Alex Minko, Staten Island, NY (US)

(73) Assignee: The United States of America, as represented by the Secretary of the Army, Washington, DC (US)

(*) Notice: Subject to any disclaimer, the term of this patent is extended or adjusted under 35 U.S.C. 154(b) by 1565 days.

(21) Appl. No.: 13/431,024

(22) Filed: Mar. 27, 2012

(51) Int. Cl.
| | |
|---|---|
| H01Q 3/00 | (2006.01) |
| H01Q 15/14 | (2006.01) |
| H01Q 19/18 | (2006.01) |
| G01S 5/02 | (2010.01) |
| G01S 5/14 | (2006.01) |

(52) U.S. Cl.
CPC ............. *H01Q 15/14* (2013.01); *G01S 5/02* (2013.01); *G01S 5/0215* (2013.01); *G01S 5/14* (2013.01); *H01Q 19/18* (2013.01); *H01Q 15/144* (2013.01); *H01Q 15/148* (2013.01)

(58) Field of Classification Search
CPC .......................................................... G01S 3/02
USPC ......................................................... 342/359
See application file for complete search history.

(56) References Cited

U.S. PATENT DOCUMENTS

| | | | |
|---|---|---|---|
| 4,254,421 A | 3/1981 | Kreutel, Jr. | |
| 4,595,929 A | 6/1986 | Kreutel, Jr. | |
| 4,707,697 A * | 11/1987 | Coulter et al. | 342/25 A |
| 5,424,737 A * | 6/1995 | Lindell | 342/5 |
| 5,793,001 A * | 8/1998 | Ferralli | 181/155 |
| 6,512,486 B1 * | 1/2003 | Desargant et al. | 343/781 CA |
| 2006/0082502 A1 * | 4/2006 | Dooley | 342/453 |
| 2006/0246261 A1 * | 11/2006 | Kasabo et al. | 428/182 |
| 2008/0051122 A1 * | 2/2008 | Fisher | 455/466 |
| 2008/0122683 A1 * | 5/2008 | Howley et al. | 342/149 |
| 2009/0079644 A1 | 3/2009 | May et al. | |
| 2009/0146907 A1 * | 6/2009 | Brown | 343/912 |
| 2011/0063179 A1 * | 3/2011 | Guler | 343/766 |
| 2011/0183690 A1 * | 7/2011 | Kobayakawa | 455/456.5 |
| 2012/0133542 A1 * | 5/2012 | Ben-Shmuel | 342/5 |

OTHER PUBLICATIONS

Antenna Theory(colon) A Review, Balanis, Proc. IEEE vol. 80 No. 1 Jan. 1992.pdf.*

* cited by examiner

*Primary Examiner* — Dameon E Levi
*Assistant Examiner* — Ricardo Magallanes
(74) *Attorney, Agent, or Firm* — Ronald Krosky; Azza Jayaprakash

(57) ABSTRACT

Systems, methods, and other embodiments associated with reflectors are described. One example system comprises a collection antenna. The system also comprises a reflector configured to reflect a designated signal to the collection antenna and configured to reflect a non-designated signal away from the collection antenna.

19 Claims, 16 Drawing Sheets

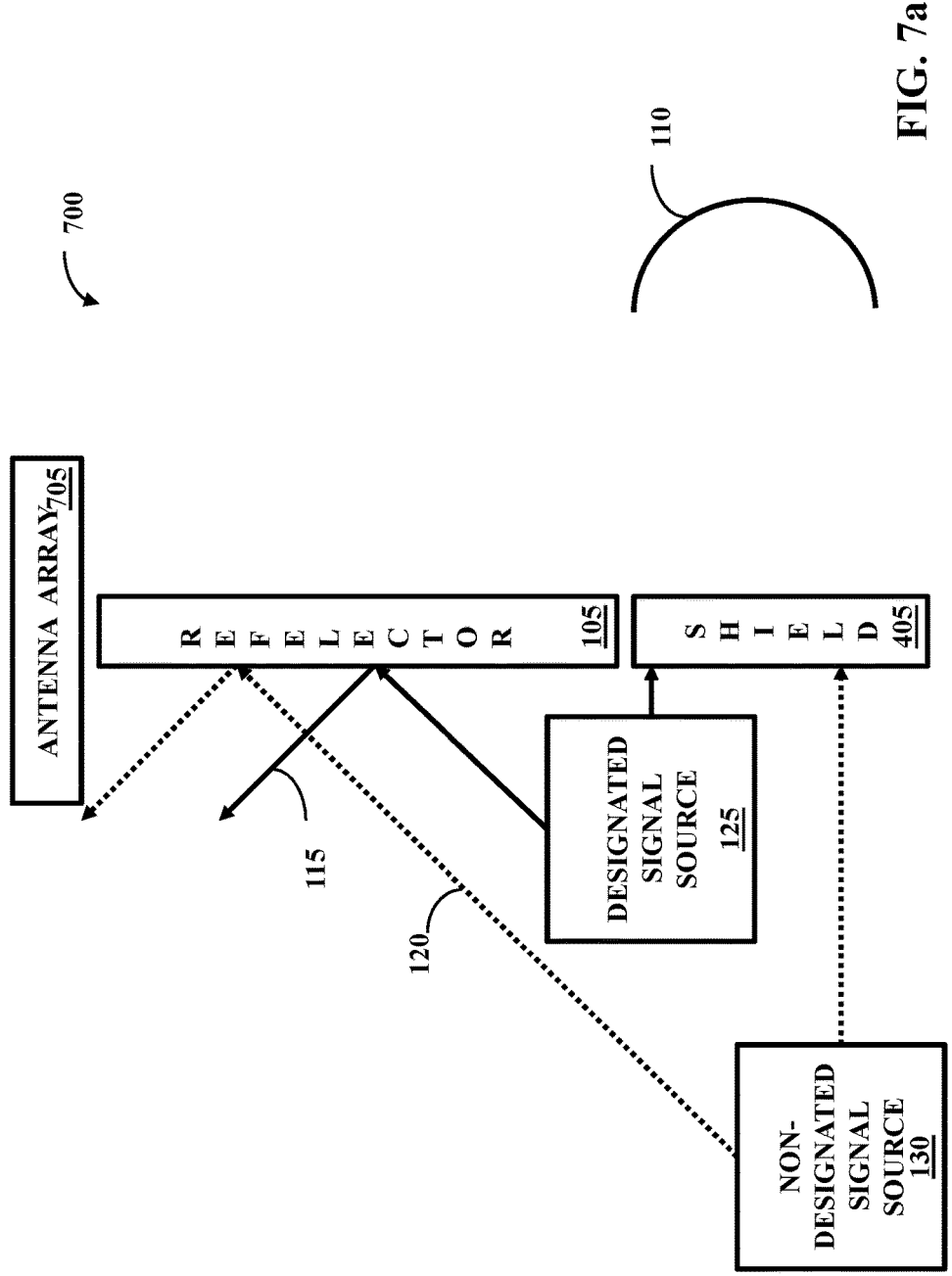

REFLECTOR

GOVERNMENT INTEREST

The innovation described herein may be manufactured, used, imported, sold, and licensed by or for the Government of the United States of America without the payment of any royalty thereon or therefor.

BACKGROUND

A source can communicate radio frequency (RF) messages. These messages can be intended for receipt by specific units. However, these messages can be communicated in an environment with a relatively large amount of interference. For example, other messages can be communicated concurrently with the RF messages. These other messages can be of the same frequency as the RF messages and/or be emitted from a location that is relatively close to the source. Thus, the specific unit may struggle to distinguish one message from another.

BRIEF DESCRIPTION OF THE DRAWINGS

Incorporated herein are drawings that constitute a part of the specification and illustrate embodiments of the detailed description. The detailed description will now be described further with reference to the accompanying drawings as follows:

FIGS. 7a and 7b illustrate alternative embodiments of an environment that includes a system comprising an antenna array in addition to the reflector and the collection antenna;

DETAILED DESCRIPTION

Figure 1:
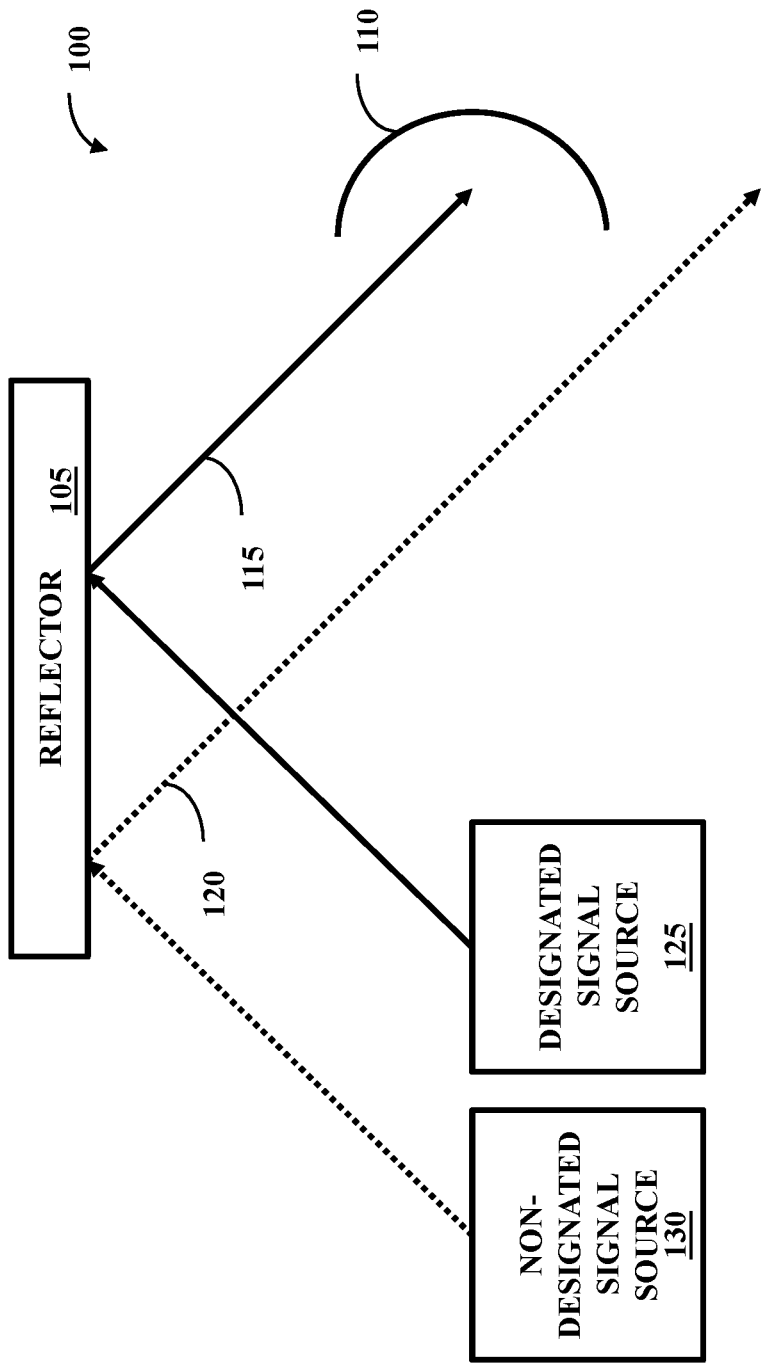
FIG. 1 illustrates one embodiment of an environment that includes a system comprising a reflector and a collection antenna.

In one embodiment, a collection antenna can be placed in an environment where multiple radio frequency (RF) signals are present. An entity operating the collection antenna can have a goal of receiving a desired RF signal while ignoring a remaining RF signal (or signals). To accomplish this goal, a shield and set of reflector plates can be employed. The shield can block RF signals while the reflector plates focus RF signals to the collection antenna. The reflector plates can be positioned in such a way that the desired RF signal is focused on the collection antenna while the remaining RF signal(s) is directed away from the collection antenna. This spatial filtering facilitates achievement of the goal.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single logical component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs including separate applications or code from dynamically linked libraries.

FIG. 1 illustrates one embodiment of an environment 100 that includes a system comprising a reflector 105 and a collection antenna 110. The reflector 105 is configured to reflect a designated signal 115 to the collection antenna 110 and configured to reflect a non-designated signal 120 away from the collection antenna 110.

In one embodiment, the designated signal 115 and the non-designated signal 120 are of equal frequency and the non-designated signal 120 is of greater signal strength than the designated signal 115. Thus, the system can be used to filter out the signal with greater strength (e.g., the non-designated signal 120) such that the collection antenna 110 focuses on the signal of less strength (e.g., the designated signal 115).

A designated signal source 125 produces the designated signal 115 while a non-designated signal source 130 produces the non-designated signal 120. In one example, the environment 100 can be a combat environment where the designated signal source 125 is a wounded soldier. Other sources can be present in the combat environment, such as fellow soldiers, enemy soldiers, non-combat sources, and others. An operator of the system can desire to receive the designated signal 115 at the collection antenna 110 and ignore signals from other sources. These other sources can be the non-designated signal source 130 producing the non-designated signal 120. The reflector 105 can be configured to function as a mirror and have the designated signal 115 reflect to the collection antenna 110 and the non-designated signal 115 reflect away from the collection antenna 110. By receiving the designated signal 115 at the collection antenna 110, the operator can gain information transmitted from the wounded soldier such as what injury the soldier sustained so the soldier receives appropriate medical attention in a timely manner. The collection antenna 110 can be a dipole, or a plurality of dipoles, or any other type of antenna or combination of antennas.

Figure 2:
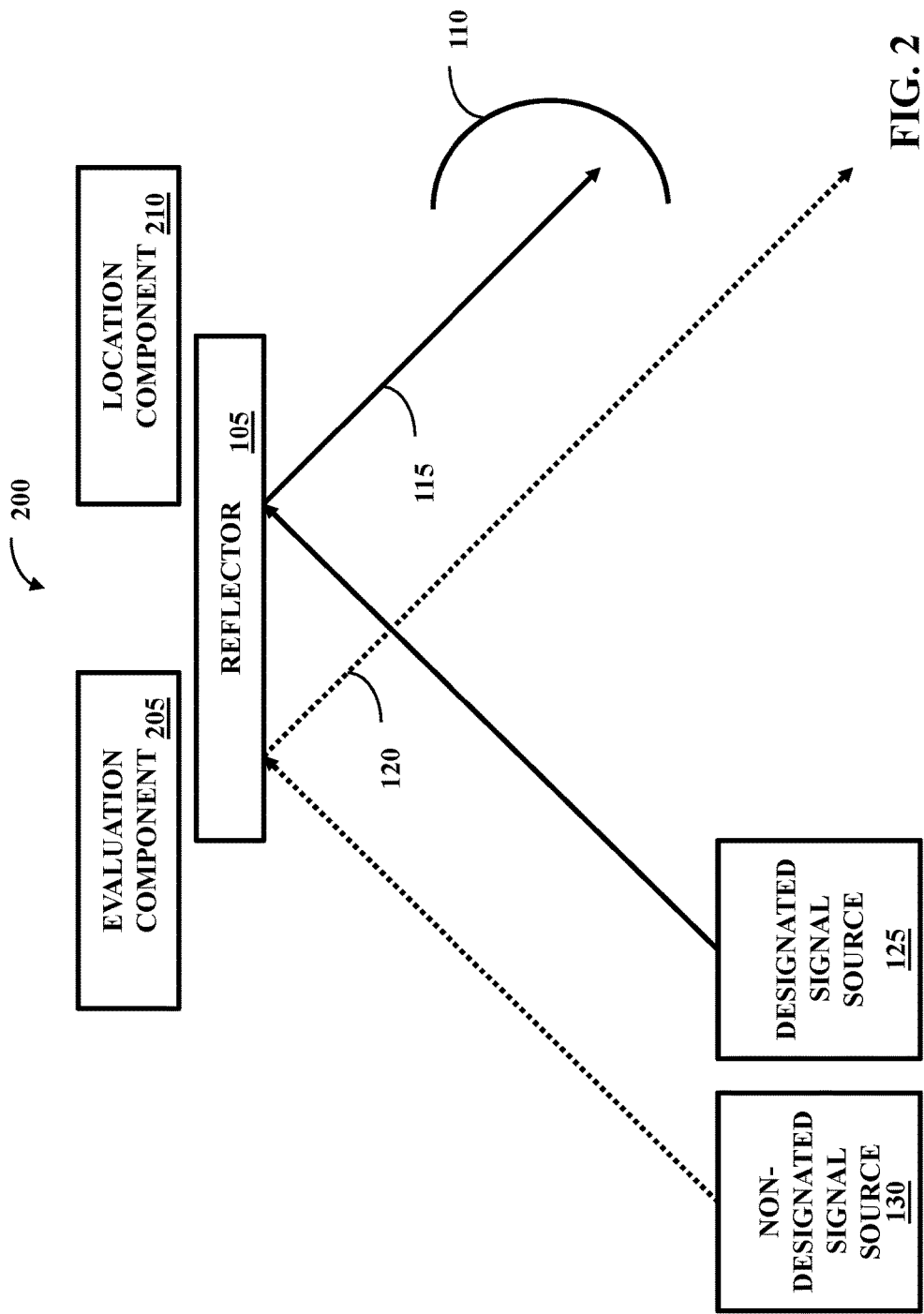
FIG. 2 illustrates one embodiment of an environment that includes a system comprising an evaluation component and a location component in addition to the reflector and the collection antenna.

FIG. 2 illustrates one embodiment of an environment 200 that includes a system comprising an evaluation component 205 and a location component 210 in addition to the reflector 105 and the collection antenna 110. The evaluation component 205 is configured to perform an evaluation on how the designated signal 115 reflects from the reflector 105. The location determination component 210 is configured to determine a location of the source of the designated signal (e.g., the designated signal source 125) based, at least in part, on a result of the evaluation.

As previously stated, the designated signal source 125 can be a wounded soldier and the designated signal 115 can be a distress signal. The wounded soldier can send out the distress signal. The collection antenna 110 receives this distress signal while the non-designated signal 120 from the non-designated signal source 130 is directed away from the collection antenna 110. The evaluation component 205 can evaluate the signal itself as well as contextual information about the signal. In one example of evaluating the signal itself, the signal can be evaluated to determine that the signal is the distress signal. As part of the evaluation, the evaluation component 205 can identify a position of the reflector 105 (e.g., an angle of the reflector 105) as well as identify a distance of the reflector 105 from the collection antenna 110. The location component 210 can use the identified angle and identified distance to calculate a position of the wounded soldier (e.g., in a manner as discussed in FIG. 8 below).

Figure 3:
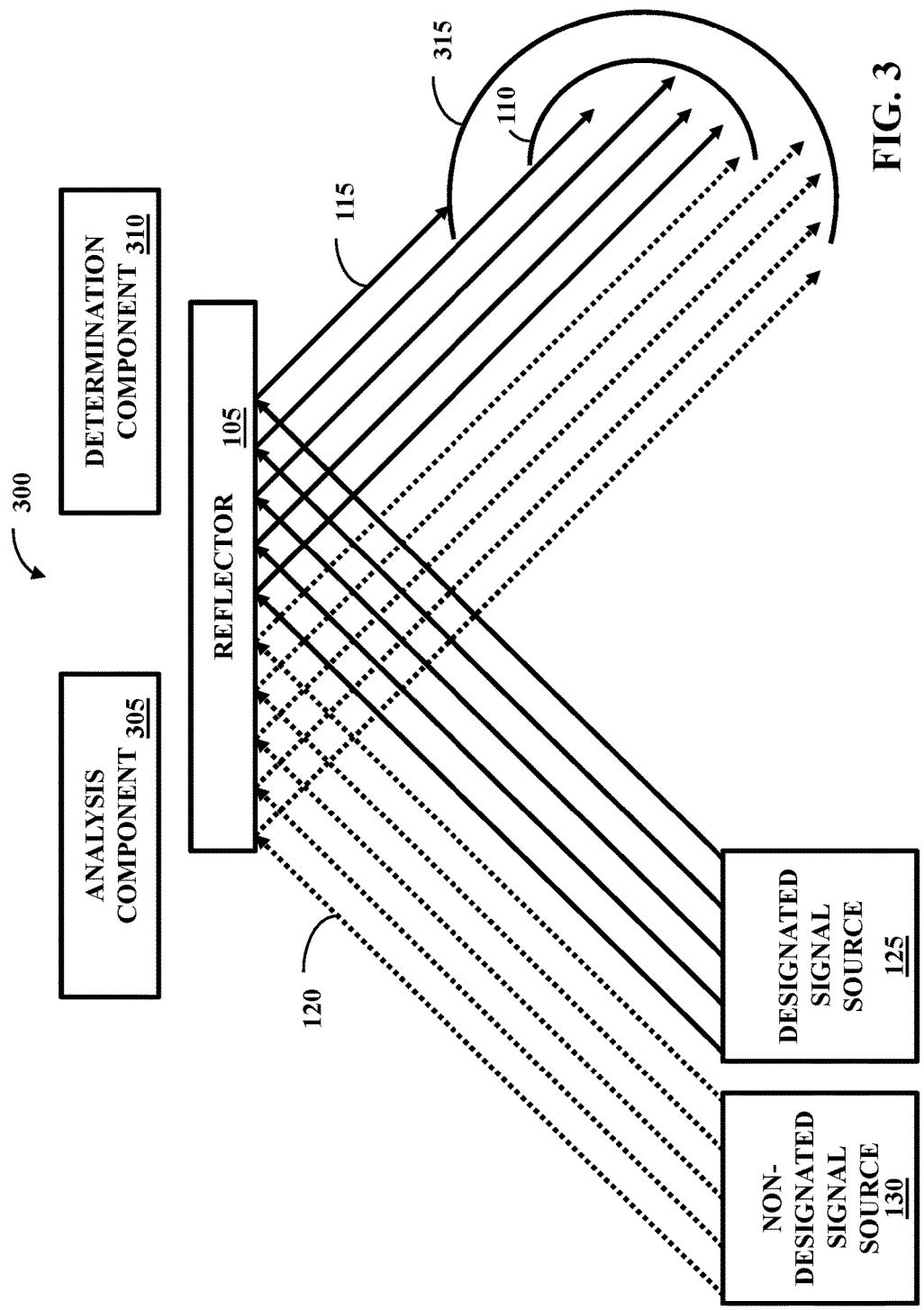
FIG. 3 illustrates one embodiment of an environment with a system comprising the reflector, the collection antenna, an analysis component, and a determination component.

FIG. 3 illustrates one embodiment of an environment 300 with a system comprising the reflector 105, the collection antenna 110, an analysis component 305, and a determination component 310. The reflector 105 can reflect various signals to the collection antenna 110 before a determination is made on if an unidentified signal is the designated signal 115 or the non-designated signal 120. The analysis component 305 is configured to perform an analysis of the unidentified signal. The determination component 310 is configured to make a determination of if the unidentified signal is the designated signal 115 or the non-designated signal 120. The reflector 105 is configured for movement to a position (e.g., a mechanism moves the reflector to the position) to reflect the designated signal 115 to the collection antenna 110 after the determination is made and to reflect the non-designated signal 120 away from the collection antenna 110 after the determination is made (e.g., actual movement may not occur, but the ability of movement to the position).

The environment 300 includes two signals 115 and 120. The reflector 105 reflects the signals 115 and 120 to the collection antenna 110. The analysis component 305 can analyze the signals 115 and 120 and the determination component 310 can make a determination about the signal from a result of the analysis. For example, the analysis component 305 analyzes the signals 115 and 120 for content and the determination component 310 determines that the signal 115 is an SOS signal while the signal 120 is a non-SOS signal. If the reflector 105 and the collection antenna 110 are functioning to identify and process SOS signals, then the signal 115 becomes the designated signal and the signal 120 becomes the non-designated signal. The reflector 105 is positioned such that the designated signal 115 is reflected to the collection antenna 110 and the non-designated signal 120 is reflected away from the collection antenna 110.

In one embodiment, the collection antenna 110 comprises an RF guard 315. The RF guard 315 functions to protect the collection antenna 110 from interference. For example, the RF guard 315 protects the collection antenna 110 from RF signals generated by a source behind the collection antenna 110.

While the designated signal 115 and non-designated signal 120 are shown elsewhere herein as being single rays originating from the designated signal source 125 and the non-designated signal source 130, other arrangements may occur. For example, the signals 115 and 120 can emit as multiple rays from their respective sources 125 and 130. A situation may arise where a determined position of the reflector 105 facilitates both signals 115 and 120 to reach the collection antenna 110. The reflector 105 can be positioned in such a way that more rays of the designated signal 115 (four out of five rays) reach the collection antenna 110 than rays of the non-designated signal 120 (one out of five). With this position, the signal-to-noise ratio (SNR) of the designated signal 115 is higher than the SNR of the non-designated signal 120 at the collection antenna 110. Thus, the reflector 105 being configured to reflect the designated signal 115 to the collection antenna 110 and being configured to reflect a non-designated signal 120 away from the collection antenna 110 does not necessarily mean that the designated signal 115 is completely reflected to the collection antenna 110 and that the non-designated signal is completed reflected away from the collection antenna 110.

Figure 4:
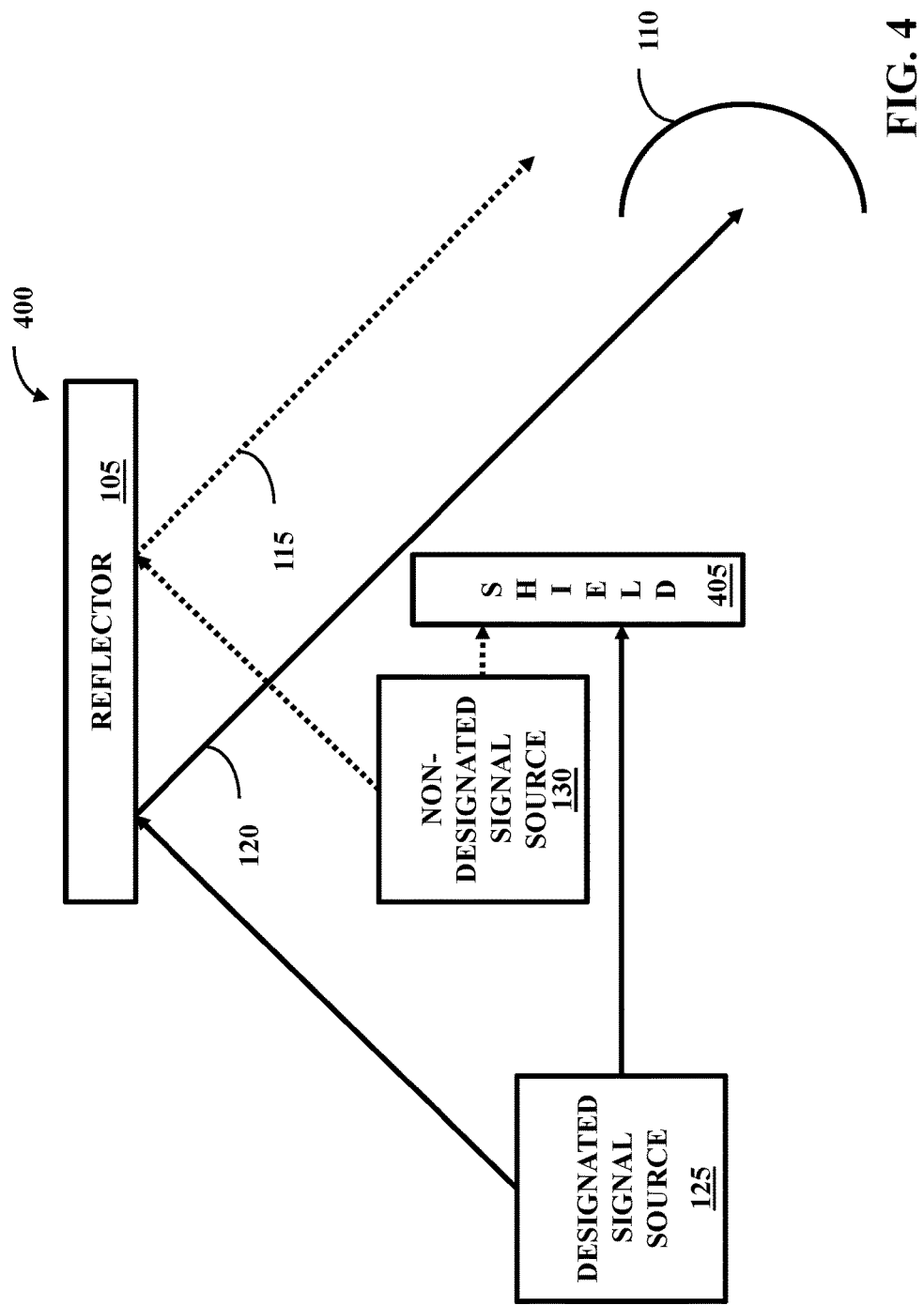
FIG. 4 illustrates one embodiment of an environment that includes a system comprising a shield in addition to the reflector and the collection antenna.

FIG. 4 illustrates one embodiment of an environment 400 that includes a system comprising a shield 405 in addition to the reflector 105 and the collection antenna 110. The shield 405 is configured to prevent the designated signal 115 from directly reaching the collection antenna 110 and configured to prevent the non-designated signal 120 from directly reaching the collection antenna 110. In other words, directly means reaching the collection antenna 110 without reflecting from the reflector 105.

The signals 115 and 120 can be emitted in multiple directions from the designated signal source 125 and the non-designated signal source 130 respectively. Without the shield 405, the signals 115 and 120 would directly reach the collection antenna 110. Thus, without the shield 405 the system of the environment 400 would not filter out the designated signal 115 from the non-designated signal 120. Conversely, with the shield 405 the system of the environment 400 prevents the signals 115 and 120 from directly reaching the collection antenna 110 and instead facilitates the reflector 105 to be used to direct the signals 115 and 120 to the collection antenna 110.

Figure 5:
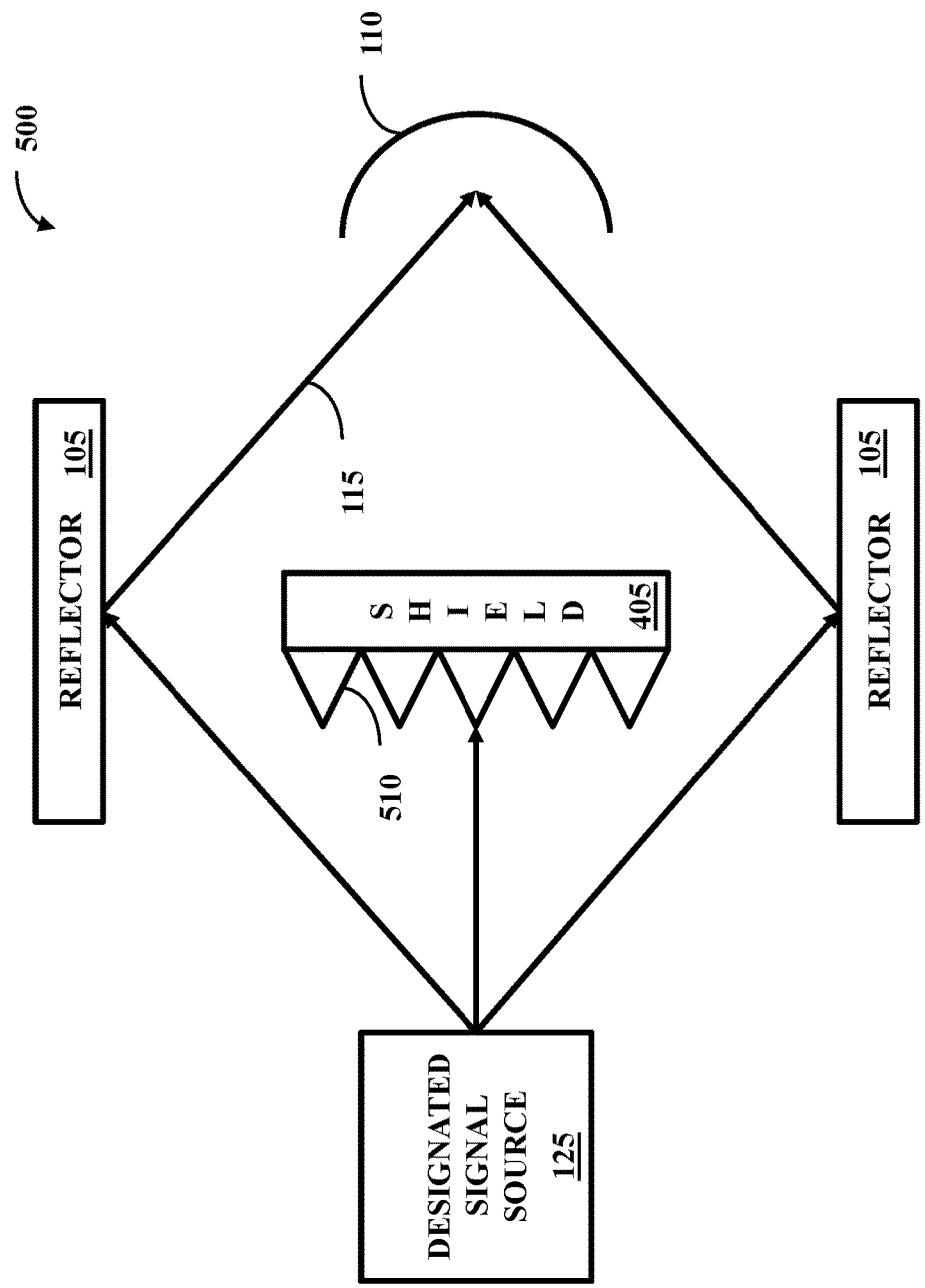
FIG. 5 illustrates one embodiment of an environment with a system comprising the reflector, the collection antenna, and the shield.

FIG. 5 illustrates one embodiment of an environment 500 with a system comprising the reflector 105 (e.g., illustrated as two separate and distinct reflectors), the collection antenna 110, and the shield 405. The designated signal source 125 transmits the designated signal 115 in multiple directions. In one embodiment, the shield 405 blocks part of the designated signal 115 while the reflector 105 reflects part of the designated signal 115 to the collection antenna 110.

In one embodiment, the shield 405 blocks the designated signal 115 through use of physical elements of the shield 405. In one example, the shield 405 comprises a tile section 505 and a cone section 510. The tile section 505 can be ferrite tile and the cone section 510 can be individual cones made of RF absorber foam. In one embodiment, a tile and cone configuration can cover both sides of the shield 405. The tile section 505 can be configured to prevent the designated signal 115 from directly reaching the collection antenna 110 when the designated signal 115 is within a first frequency range (e.g., 30 MHz to 1 GHz). Similarly, the cone section 510 can be configured to prevent the designated signal 115 from directly reaching the collection antenna 110 when the designated signal 115 is within a second frequency (e.g., 100 MHz to 40 GHz). The first frequency range and second frequency range blocked by the shield 405 are different ranges that may or may not overlap.

The reflector 105, the collection antenna 110, and/or the shield 405 can be physically connected as part of a single unit. In one example, structural supports can connect the reflector 105 to the shield 405 while the collection antenna 110 is a physically separate unit. In one example, the reflector 105, the collection antenna 110, and the shield 405 are physically connected as part of a single, larger unit. Different configurations can occur for the single unit. For example, the reflector 105 can be mounted on a structure with fiberglass rings.

Figure 6:
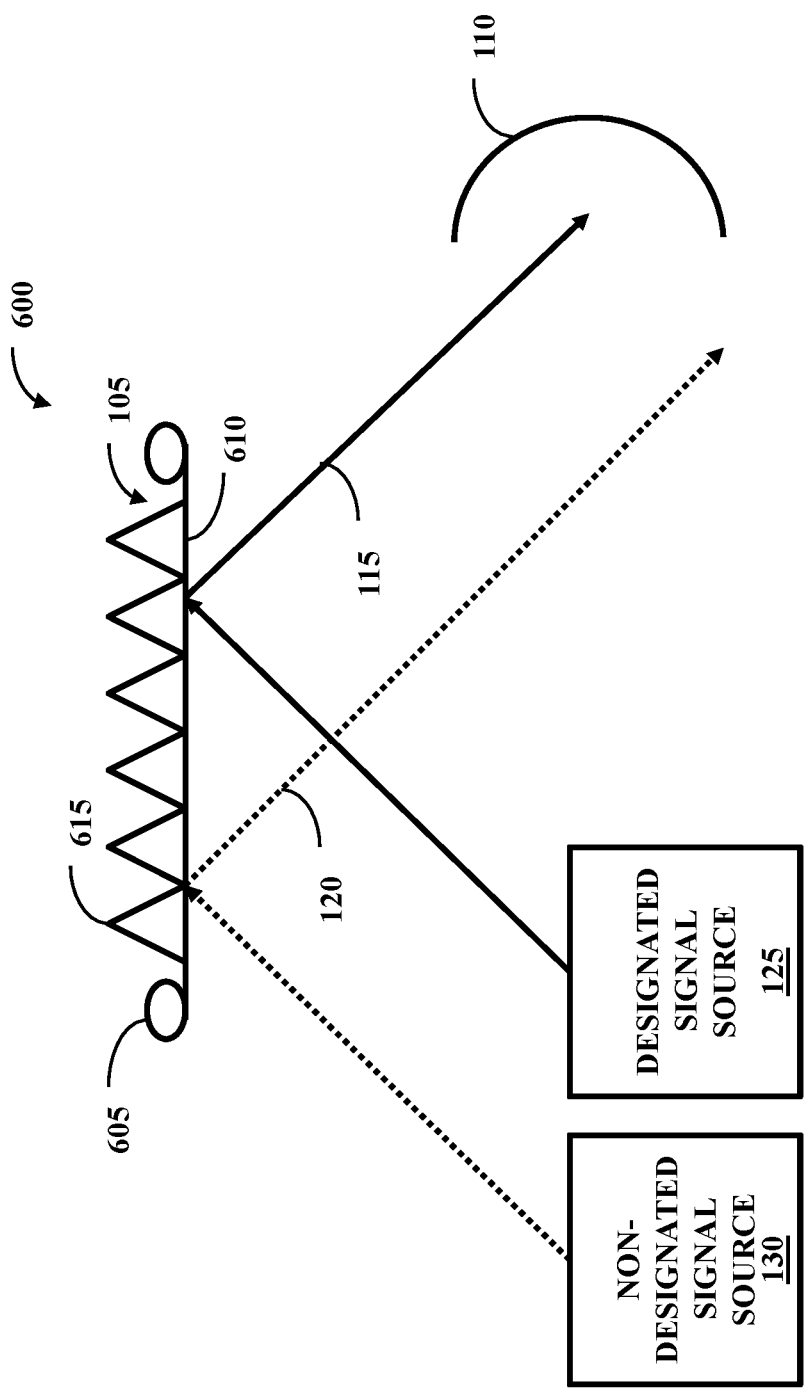
FIG. 6 illustrates one embodiment of an environment with a system comprising the reflector and the collection antenna.

FIG. 6 illustrates one embodiment of an environment 600 with a system comprising the reflector 105 and the collection antenna 110. As previously discussed, the reflector 105 reflects the designated signal 115 produced from the designated signal source 125 to the collection antenna 110 and reflects the non-designated signal 120 produced from the non-designated source 130 away from the collection antenna 110. In one embodiment, the reflector 105 is at least one reflector plate that terminates at opposite ends with an elliptical shape 605. The reflector plate can be of one piece of structure bent at the ends to form the elliptical shape 605. The reflector 105 that is the reflector plate terminates at opposite ends with an elliptical shape 605 can be used to prevent diffraction.

In one embodiment, the reflector 105 comprises a signal reflective side 610 and a signal absorbent side 615. The signal reflective side 610 is more signal reflective than the signal absorbent side 615 while the signal absorbent side 615 is more signal absorbent than the signal reflective side 610. The opposite ends with the elliptical shape 605 turn toward the signal absorbent side 615. The signal absorbent side 615 prevents the reflector plate from being illuminated by an RF signal. With an illuminated reflector plate, oscillation can occur and the RF signal can re-radiate. This re-radiation may interfere with spatial filtering of the collection antenna 110 (e.g., distinguishing between the designated signal 115 and the non-designated signal 120). In one embodiment, the signal absorbent side 615 is covered with an RF absorbent paint (e.g., a paint that makes the reflector plate more signal absorbent than without the paint), a carbon-based foam material, or a ferrite tile. The RF guard 315 depicted in FIG. 3 may also have these RF absorbers on the surface for the same purpose of absorbing the unwanted RF signals from the environment.

Figure 7B:
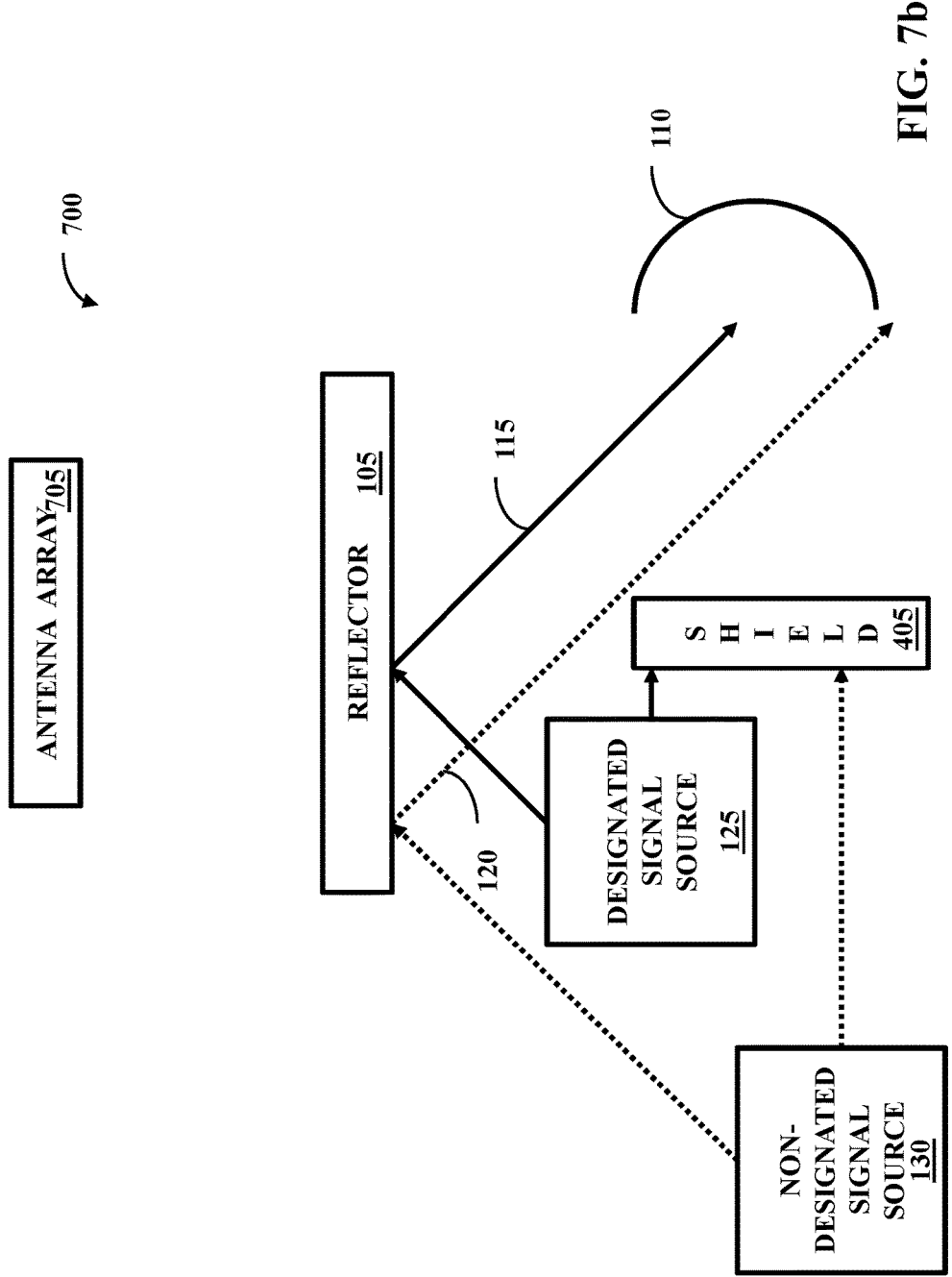

FIGS. 7a and 7b illustrate alternative embodiments of an environment 700 that includes a system comprising an antenna array 705 in addition to the reflector 105 and the collection antenna 110. The system is also shown as comprising the shield 405 along with the antenna array 705. The antenna array 705 is configured to determine a direction from the designated signal source 125 of the designated signal 115, where the reflector 105 is moved based, at least in part, on the direction. The reflector 105 is moved to a position that causes the designated signal 115 to be reflected to the collection antenna 110 and to reflect the non-designated signal 120 from the non-designated source 130 away from the collection antenna 110.

FIG. 7a illustrates when the reflector 105 is in a neutral position (e.g., a position not selected for a signal to be reflected to the collection antenna 110) while FIG. 7b illustrates when the reflector 105 is in an active position. In the neutral position, the reflector 105 and shield 405 do not permit signal 115 or signal 120 to reach the collection antenna 110. The system can determine that the designated signal 115 is present in the environment 700 (e.g., by way of reading a request from an operator to find a wounded soldier distress signal and scanning for the wounded soldier distress signal.) The antenna array 705 can determine a direction of the source. In light of this determined direction, the reflector 105 can be moved from the neutral position or other position to the active position. For example, a reflective side of the reflector 105 can be positioned toward the direction such that the designated signal 115 reflects to the collection antenna 110 and the non-designated signal 120 reflects away from the collection antenna 110.

Figure 8:
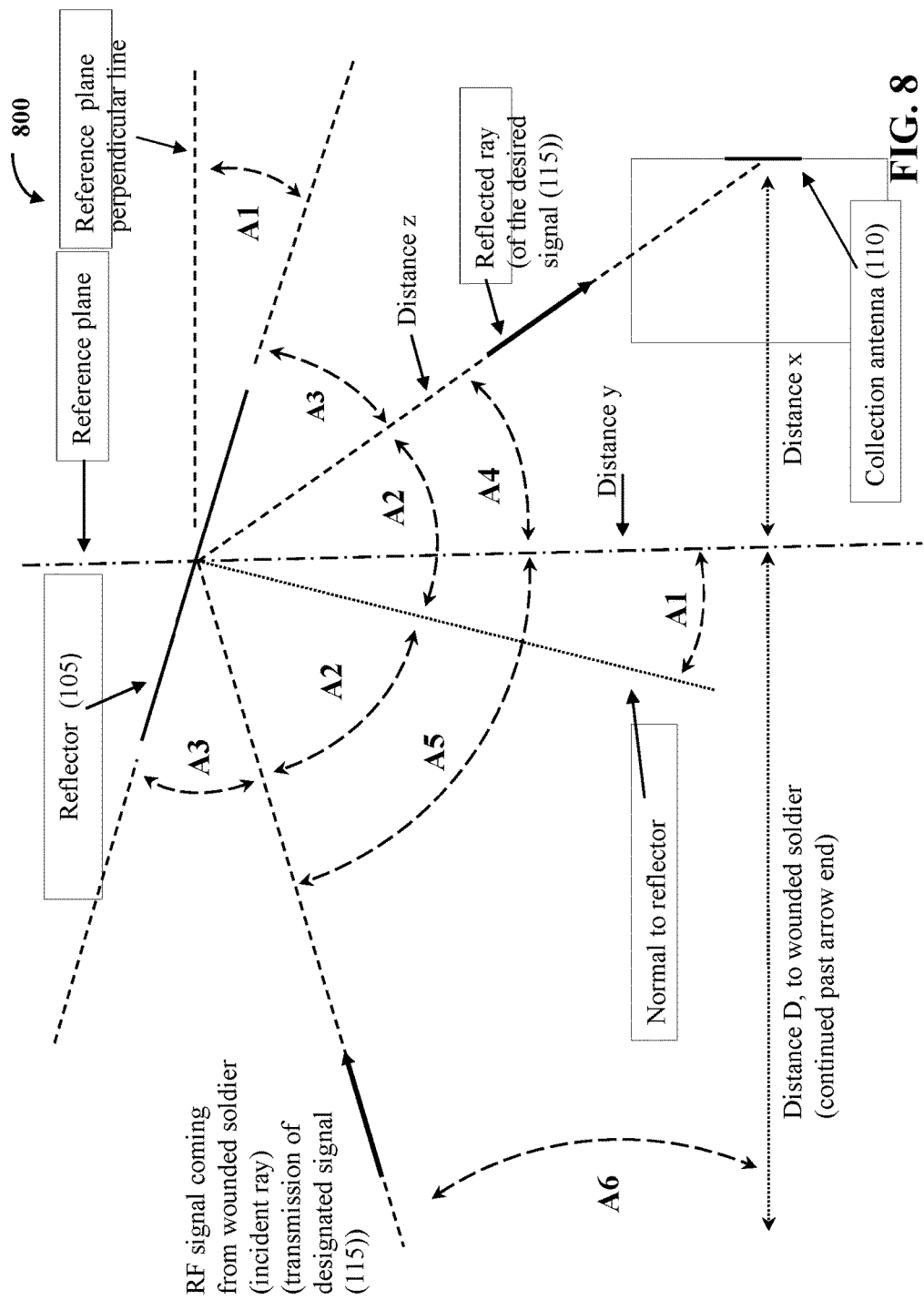
FIG. 8 illustrates one embodiment of an environment with a system comprising the reflector and the collection antenna.

FIG. 8 illustrates one embodiment of an environment 800 with a system comprising the reflector 105 and the collection antenna 110. The environment 800 includes the designated signal 115 functioning as an incident ray that is an RF signal from a wounded soldier functioning as a reflected ray. Mathematics can be used based on information illustrated in the environment 800 to determine a distance to (and location of) the wounded soldier.

Distances illustrated in the environment 800 include distance x, distance y, distance z, and distance D. Distance x is a horizontal distance from the collection antenna 110 to a reference plane. Distance y is the vertical distance from the center of the reflector 105 (along the reference plane) to the horizontal level of the collection antenna 110. Distance z is the diagonal distance from the center of the reflector 105 to the center of the collection antenna 110. Distance D is the distance from the wounded soldier to the reference plane.

Distances x, y, and z, as well as angles, can be used to calculate distance D. Angles illustrated in the environment 800 include A1, A2, A3, A4, A5, and A6. A1 is the angle at which the reflector 105 is set during an operation (e.g., when the reflector 105 is positioned to reflect the designated signal to the collection antenna 110 and configured to reflect the non-designated signal away from the collection antenna 110). A1 is a known quantity as being the angle between reflector 105 and a reference plane perpendicular line. A1 is also the angle between the reference plane and the normal to the reflector 105. A2 is an angle of incidence. In other words, A2 is the angle between the incident ray, which is coming from the wounded soldier (e.g., a wounded soldier's radio), and a normal of the reflector 105. The angle of incidence is equal to the angle of reflection. The angle of reflection is the angle between reflected ray and the normal to the reflector 105. A3 is the angle between the reflected ray and the reflector 105 (e.g., when both pre-reflected and post-reflected). A4 is an angle between the reflected ray and the reference plane. A4 is based on the configuration of the system of the environment 800 and is a known quantity. A5 is an angle between the incident ray and the reference plane. A6 is an angle between the incident ray and the vector from the wounded soldier to the collection antenna 110.

The distance to the wounded soldier (distance D) can be calculated by a calculation component. As previously stated, angles A1 and A4 are known. A control component can cause the reflector 105 to move to a position and from this position A1 can be determined. The sum of A1, A3, and A4 equals 90 degrees, so A3 can be calculated by subtracting A1 and A4 from 90 degrees. In addition, the sum of A2 and A3 is equal to 90 degrees. Since A3 is determinable from A1 and A4, then A2 is calculable by subtracting A3 from 90 degrees. A5 is the sum of A1 and A2 which are now known while the sum of A5 and A6 is 90 degrees. Thus, A6 is calculable by subtracting A5 from 90 degrees. The tangent of A6 is the distance y over the distance D. Thus, to solve for distance D, distance y is divided by the tangent of A6. Through these mathematical operations, the calculation component solves for distance D. With distance D known, aid can be accurately sent to the wounded soldier. It is to be appreciated by one of ordinary skill in the art that while examples herein discuss a military context (e.g., a wounded soldier), these aspects disclosed herein can be practiced in other contexts. Aspects disclosed herein can be applicable in other contents, including, but not limited to a rescue device, telecommunications, and other. Additionally, it is to be appreciated by one of ordinary skill in the art that other mathematical operations or other means (e.g., globally sending a response communication, reading encoded information in a distress signal, etc.) may be used to locate the wounded soldier.

Figure 9:
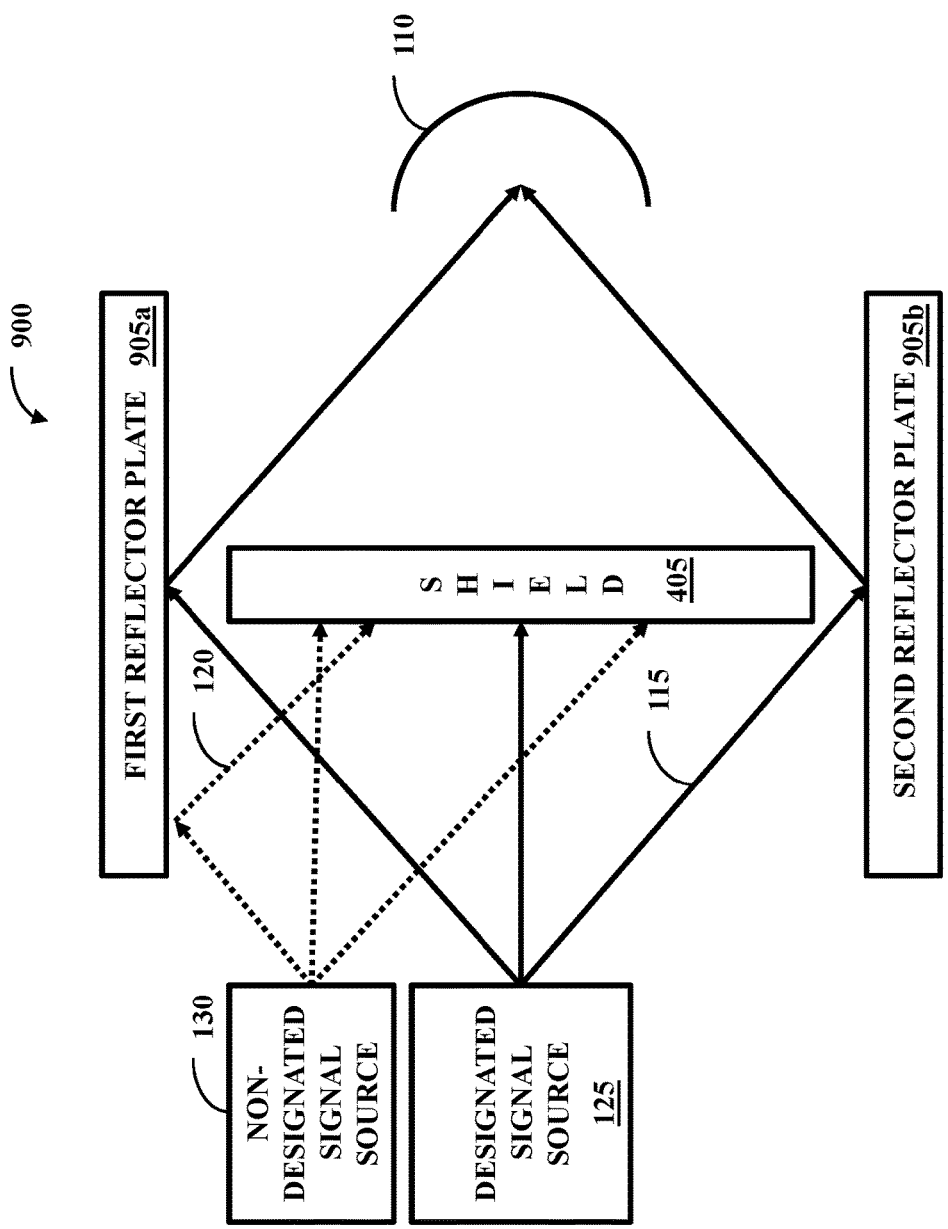
FIG. 9 illustrates one embodiment of an environment with a system comprising the shield and a plurality of reflector plates.

FIG. 9 illustrates one embodiment of an environment 900 with a system comprising the shield 405 and a plurality of reflector plates. The plurality of reflector plates is configured to reflect the designated signal 115 to the collection antenna 110. The plurality of reflector plates is also configured to reflect the non-designated signal 120 away from the collection antenna 110. The plurality of reflector plates comprises a first reflector plate 905a and a second reflector plate 905b. Thus, the plurality of reflector plates comprises at least two reflector plates used to reflect the designated signal 115 and the non-designated signal 120.

In one embodiment, the first reflector plate 905a and the second reflector plate 905b terminate at opposite ends with an elliptical shape. An angle the designated signal 115 intersects with the first reflector plate 905a and with the second reflector plate 905b and an angle of the first reflector plate 905a and the second reflector plate 905b to the collection antenna 110 are used to determine the position (e.g., the position is determined in accordance with aspects discussed with regard to FIG. 8). In addition, the collection antenna 110 can comprise a radio frequency guard.

The shield 405 is configured to prevent the designated signal 115 from directly reaching the collection antenna 110. The shield 405 is also configured to prevent the non-designated signal 120 from directly reaching the collection antenna 110. The shield 405 is disposed between the first reflector plate 905a and the second reflector plate 905b. The shield 405 is an RF shield that can be metallic and block out emission from unwanted sources (e.g., enemy jamming in a combat setting).

In one embodiment, the system can be employed in a combat environment. For example, a friendly solider can be the designated signal source 125 while an enemy soldier is the non-designated signal source 130. The non-designated signal 120 can be a jamming signal sent from the enemy solider intended to jam communication from the friendly soldier to the collection antenna 110 to jam the designated signal 115. The shield 405 can prevent the jamming signal from reaching the collection antenna 110. This prevention can include intercepting directly from the non-designated signal source 130 (e.g., by way of the shield 405) as well as reflection from the plurality of reflector plates. Thus, the enemy jamming attempt can be thwarted, made less, minimized, etc.

Figure 10:
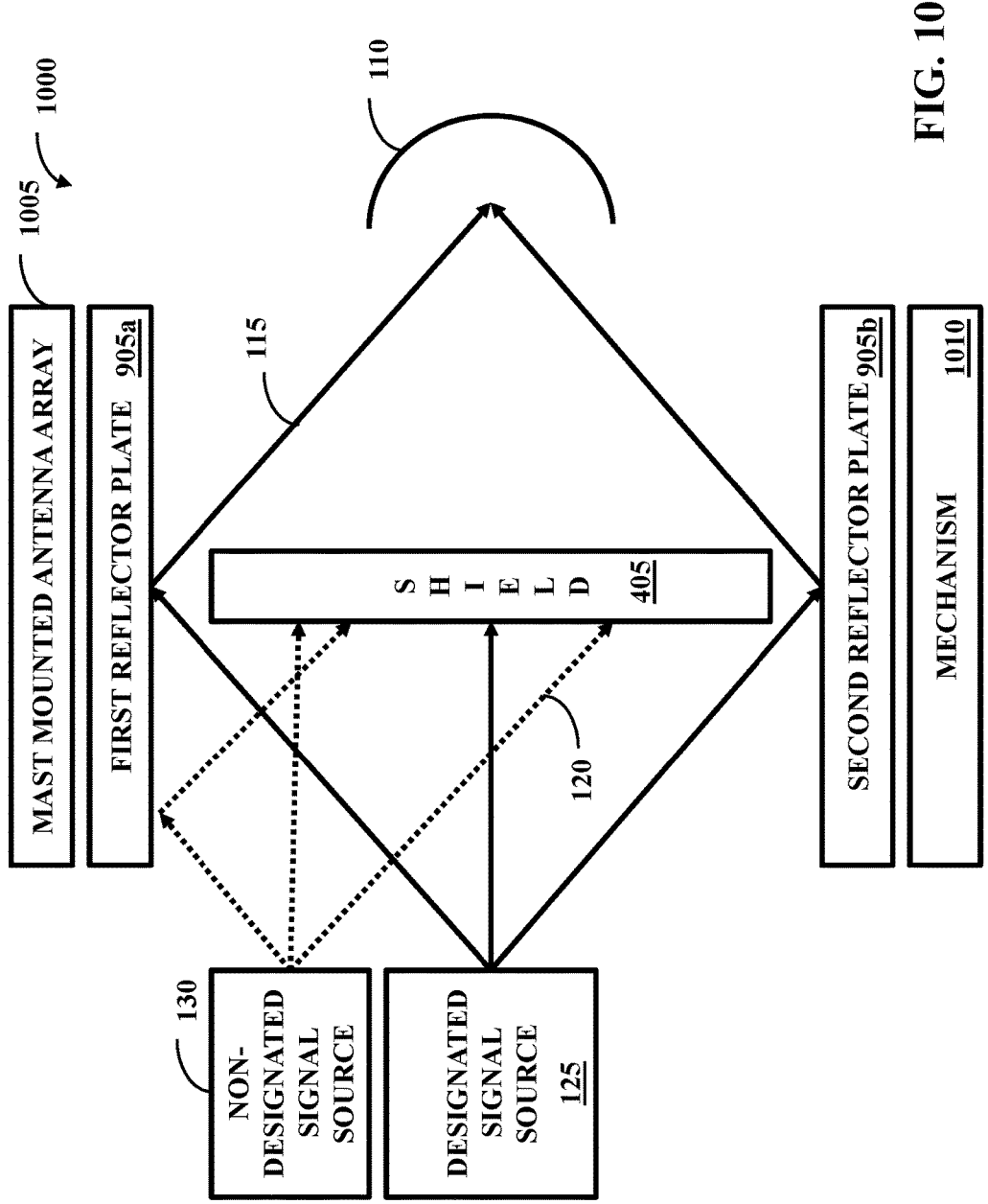
FIG. 10 illustrates one embodiment of an environment that includes a system comprising a mast mounted antenna array and a mechanism along with the collection antenna, the shield, the first reflector plate, and the second reflector plate.

FIG. 10 illustrates one embodiment of an environment 1000 that includes a system comprising a mast mounted antenna array 1005 and a mechanism 1010 along with the shield 405, the first reflector plate 905a, and the second reflector plate 905b. The mast mounted antenna array 1005 can be one embodiment of the antenna array 705 of FIG. 7 implemented as an array of copper patches on a dielectric. The mast mounted antenna array 1005 can be used to determine a direction from which the designated signal is transmitting. With this direction determined, the collection antenna 110 can be focused onto the designated signal 115 by adjusting the first reflector plate 905a and the second reflector plate 905b.

The mast mounted antenna array 1005 is configured to determine a direction of the designated signal source 125 of the designated signal 115. The mechanism 1010 is configured to cause the first reflector plate 905a and second reflector plate 905b to be positioned to a position such that a reflective portion of the first reflector plate 905a and second reflector plate 905b reflect the designated signal 115 from the designated signal source 125 to the collection antenna 110. A determination of the position of the first reflector plate 905a and second reflector plate 905b is based, at least in part, on the direction of the designated signal source 125. Thus, the mast mounted antenna array 1005 determines a direction of the designated signal source 125 and the mechanism 1010 causes the first reflector plate 905a and second reflector plate 905b to move such that the designated signal 115 is directed to the collection antenna 110 and the non-designated signal 120 from the non-designated signal source 130 is directed away from the collection antenna 110.

In one embodiment, the position is selected through a trial and error method. For example, a first arrangement of the first reflector plate 905a and second reflector plate 905b (e.g., 'y' degrees from parallel) can be tested such that the SNR for the desired signal 115 is at a value of 'x'. A second arrangement of the first reflector plate 905a and second reflector plate 905b (e.g., 'q' degrees from parallel) can be tested such that the SNR for the desired signal 115 is at a value of 'x+1'. A third arrangement of the first reflector plate 905a and second reflector plate 905b (e.g., 'h' degrees from parallel) can be tested such that the SNR for the desired signal 115 is at a value of 'x−2'. A selection component can determine that the second arrangement has the highest SNR and therefore instruct the mechanism 1010 to move the reflector to the second arrangement for a communication session. In one example, the mechanism 1010 causes the first reflector plate 905a and the second reflector plate 905b to rotate to the position and to become temporarily locked (e.g., locked until the collection antenna 110 is finished receiving the desired signal, locked until a location of the designated signal source is determined, etc.).

In addition, the selection component can run the trial and error method. For example, can cause the first reflector plate 905a and the second reflector plate 905b to move to different arrangements and then calculate how the designated signal 115 and non-designated signal 120 are received by the collection antenna 110. Based on these arrangements, the selection component can determine the position for the first reflector plate 905a and the second reflector plate 905b.

Figure 11:
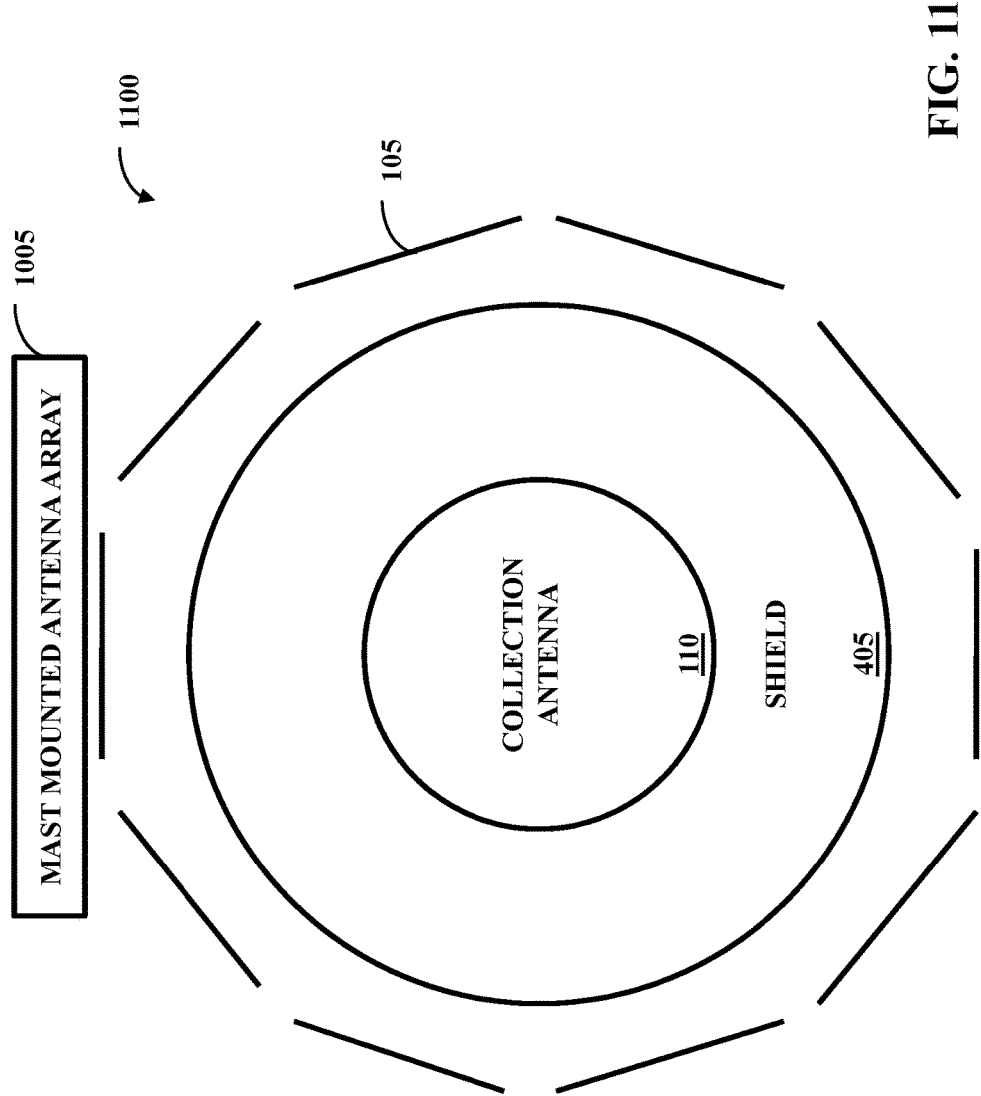
FIG. 11 illustrates one embodiment of an environment that includes a system comprising a plurality of reflectors, the collection antenna, the shield, and the mast mounted antenna array.

FIG. 11 illustrates one embodiment of an environment 1100 that includes a system comprising a plurality of reflectors 105, the collection antenna 110, the shield 405, and the mast mounted antenna array 1005. The environment 1100 can give a specific perspective view, specially a rear view of a signal apparatus from behind the collection antenna 110.

Figure 12:
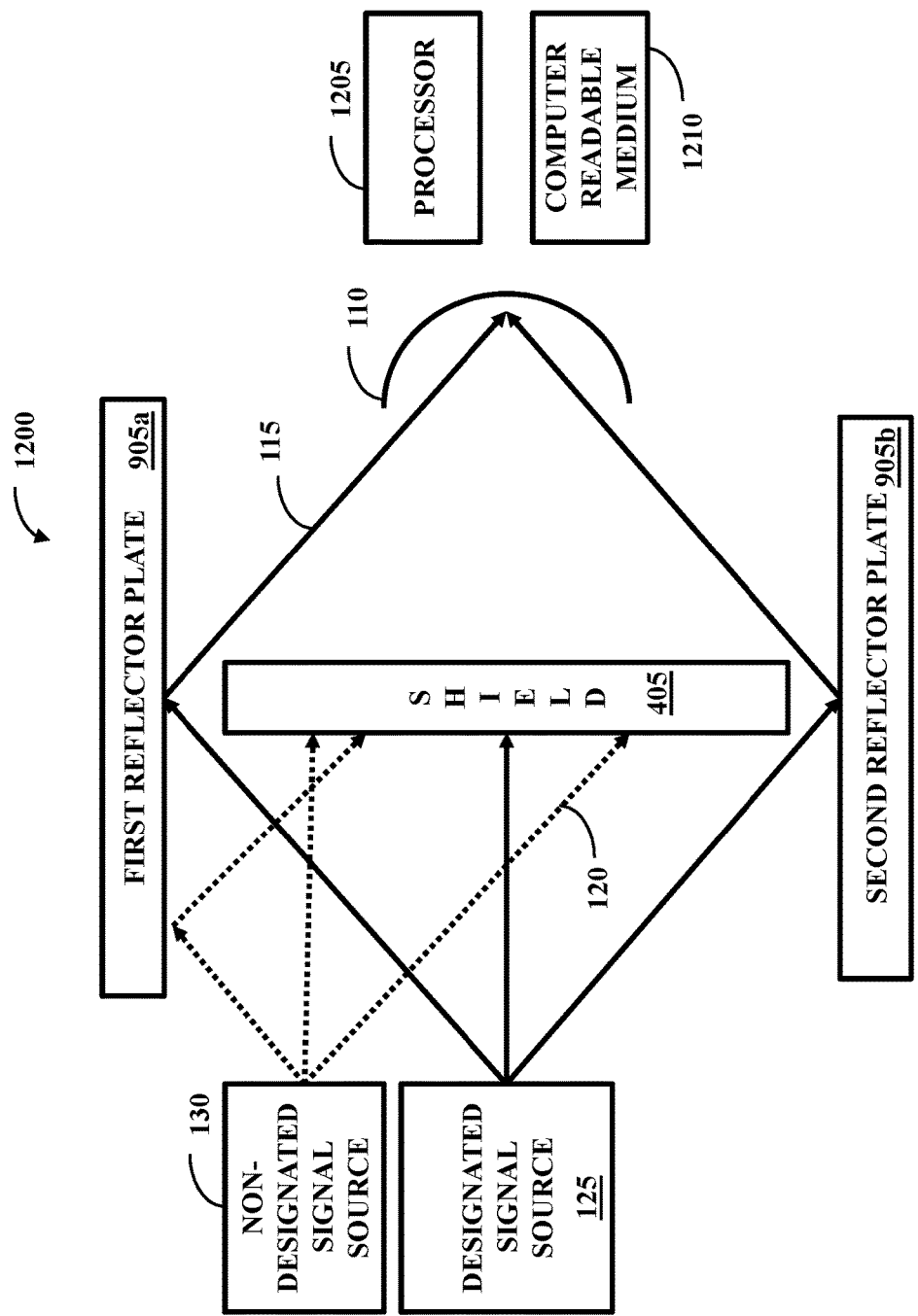
FIG. 12 illustrates one embodiment of an environment that includes a system comprising a processor and a computer-readable medium as well as the collection antenna, the shield, the first reflector plate, and the second reflector plate.

FIG. 12 illustrates one embodiment of an environment 1200 that includes a system comprising a processor 1205 and a computer-readable medium 1210 as well as the collection antenna 110, the shield 405, the first reflector plate 905a, and the second reflector plate 905b. While the system included in the environment 1200 is shown with the shield 405, the first reflector plate 905a, and the second reflector plate 905b, it is to be appreciated that the system included in the environment 1200 can comprise the processor 1205 and the computer-readable medium 1210 without the shield 405, the first reflector plate 905a, and the second reflector plate 905b. In one embodiment, components disclosed herein are, at least in part, software retained on the computer-readable medium 1210 and executed by the processor 1205. For example, the calculation component discussed with regard to FIG. 8, the control component discussed with regard to FIG. 8, and the selection component discussed regarding FIG. 10 can each be at least partially retained on the computer-readable medium 1210. In addition, information pertaining to the designated signal 115 produced from the designated signal source 125 and to the non-designated signal 120 produced from the non-designated signal source 130 can be retained on the computer-readable medium 1210 and processed by the processor 1205.

In one embodiment, a method may be implemented as computer executable instructions. In one example, the computer-readable medium 1210 stores computer executable instructions that when executed by a machine (e.g., the processor 1205) cause the machine to perform the method.

In one embodiment, a system comprises the processor 1205 and the computer-readable medium 1210, where the computer-readable medium 1210 is configured to store computer-executable instructions that when executed by the processor 1205 cause the processor 1205 to perform a method (e.g., a method disclosed herein). In one embodiment, the system also comprises the collection antenna 110, the first reflector plate 905a, and the second reflector plate 905b.

Figure 13:
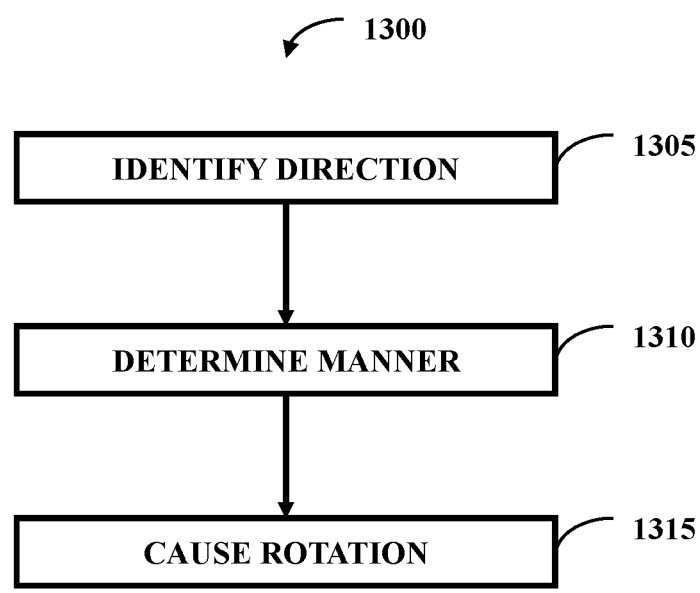
FIG. 13 illustrates one embodiment of a method that comprises direction identification, manner determination, and rotation causation.

FIG. 13 illustrates one embodiment of a method 1300 that comprises direction identification, manner determination, and rotation causation. At 1305, identifying a direction of a source of a signal of interest is illustrated. At 1310, determining a manner in which to rotate a set of reflector plates based, at least in part, on the direction is illustrated. At 1315, causing the set of reflector plates to rotate according to the manner is illustrated. The set of reflector plates are rotated such that the signal of interest is reflected from the set of reflector plates to the collection antenna and such that a signal not of interest is reflected from the set of reflector plates away from the collection antenna.

In one embodiment, the set of reflector plates comprises the first reflector plate 905a of FIG. 9 and the second reflector plate 905b of FIG. 9. Causing the set of reflector plates to rotate can comprise causing the first reflector plate 905a of FIG. 9 and the second reflector plate 905b of FIG. 9 to rotate concurrently (e.g., at least a part of a rotation sequence is performed simultaneously). In one embodiment, the set of reflector plates are configured such that the signal not of interest that is reflected away from the collection antenna is a signal configured to jam the signal of interest.

In one example, a signal receiving apparatus operating the method 1300 can operate in a tactical environment. Through intelligence information (e.g., military intelligence information downloaded by the signal receiving apparatus) a direction and/or location of a tactical signal source (e.g., an enemy signal) can be determined. Based on this determination, the reflector plates can be positioned such that the enemy signal has a relatively high SNR at the collection antenna. In one embodiment, the reflector plates and collection antenna together are considered a confocal depth probe antenna or confocal antenna. In one embodiment, the reflector plates, the collection antenna, and an RF shield are considered the confocal depth probe antenna or confocal antenna.

Figure 14:
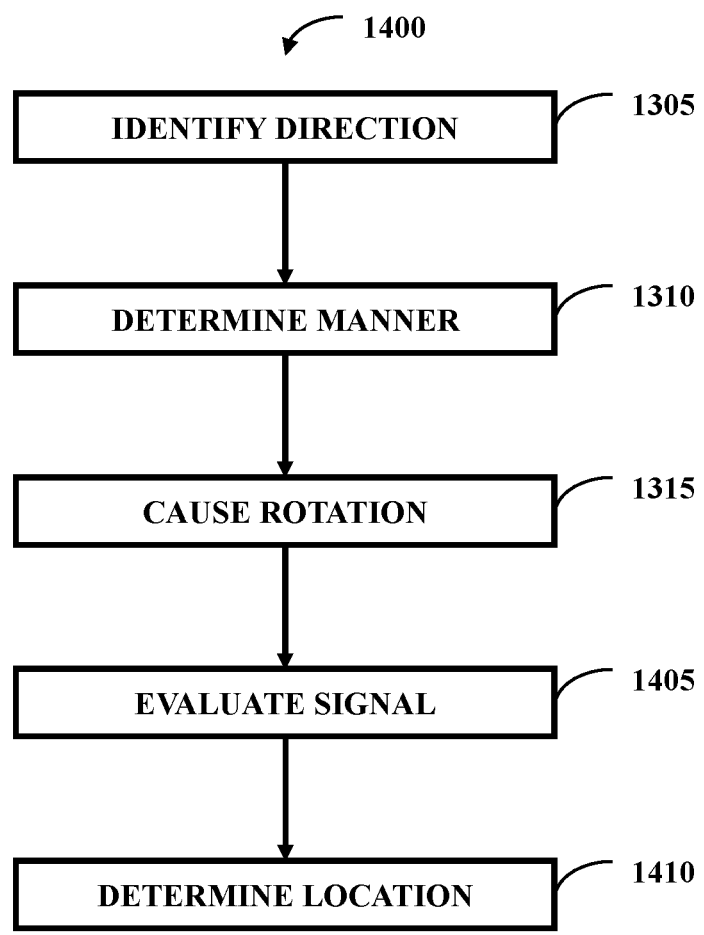
FIG. 14 illustrates one embodiment of a method that comprises direction identification, manner determination, rotation causation, signal evaluation, and location determination.

FIG. 14 illustrates one embodiment of a method 1400 that comprises direction identification, manner determination, rotation causation, signal evaluation, and location determination. A source direction is identified (1305), a rotation manner is determined (1310), and a rotation of the set of reflector plates is caused (1315). In one embodiment, the set of reflector plates comprises the first reflector plate 905a of FIG. 9 and the second reflector plate 905b of FIG. 9 and these plates terminate at opposite ends with an elliptical shape.

At 1405, evaluating how the signal of interest reflects from the set of reflector plates is illustrated. This evaluation produces an evaluation result. At 1410, determining a location of the source of the signal of interest is illustrated. The determination can be based, at least in part, on the evaluation result. For example, the evaluation can include reading angle and distance information related to the signal of interest and the determination can include performing mathematical operations (e.g., operations discussed with regard to FIG. 8).

Figure 15:
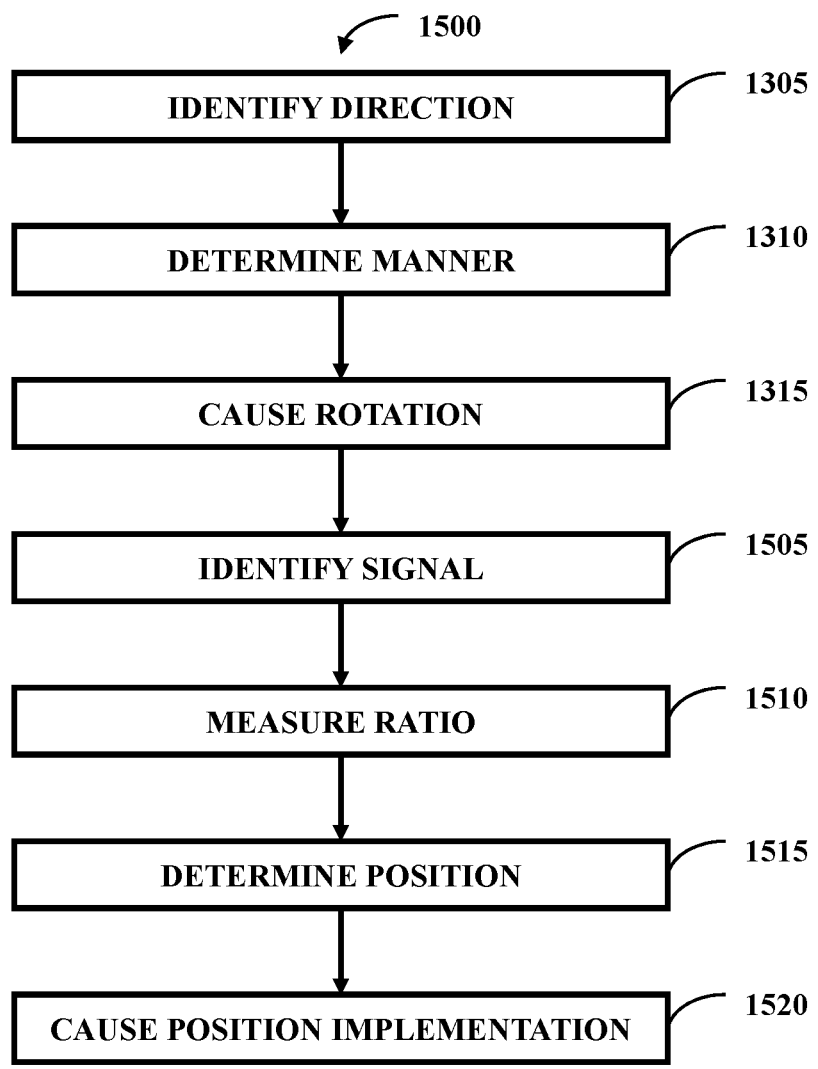
FIG. 15 illustrates one embodiment of a method that comprises direction identification, manner determination, rotation causation, signal identification, ratio measurement, position determination, and position implementation causation.

FIG. 15 illustrates one embodiment of a method 1500 that comprises direction identification, manner determination, rotation causation, signal identification, ratio measurement, position determination, and position implementation causation. A source direction is identified (1305), a rotation manner is determined (1310), and a rotation of the set of reflector plates is caused (1315). At 1505, identifying the signal of interest in response to the set of reflector plates at least partially rotating is illustrated. At 1510, measuring SNR at a set of positions for the set of reflector plates is illustrated. The set of positions comprises a first position and a second position (e.g., the first position, the second position, and a third position). At 1515, determining a position with a highest SNR is illustrated. Determination of the SNR is based, at least in part, on a result from measuring the SNR at the set of positions for the set of reflector plates. At 1520, causing the set of reflector plates to be positioned at the position with the highest SNR is illustrated.

A radar apparatus can run the method 1500. In running the method 1500, a radar apparatus can move the set of reflector plates in unison between a set range of positions. As movement occurs, the signal of interest is reflected (e.g., for at least some of the time) to an obtainment antenna (e.g., collection antenna 110 of FIG. 1) with varying SNR levels. A position corresponding to a highest SNR can be identified. The set of reflector plates can be temporarily locked at this identified position (e.g., moved to the identified position and then temporarily locked at that position).

Systems, methods, and other embodiments disclosed herein can be used to collect RF signals from a specific geographic coordinate. In one example, the signals are collected from a congested RF tactical environment. The collection antenna 110 of FIG. 1 can select a coordinate (e.g., via the selection component discussed with regard to FIG. 10) from a surrounding landscape and collect an interesting signal emanating from this coordinate (e.g., a signal source from this coordinate) using a spatial filtering technique. Interfering RF signals in the area, which can be of the same frequency and can be emitted from a location with a relatively close proximity to the signal source, can be filtered out. This filtering can be accomplished when the interfering RF signals have greater signal strength than the interesting signal. In addition to filtering, a location of the signal source can be determined, such as while in an urban tactical environment.

In one embodiment, the signal source is an enemy transmission source. The reflector 105 of FIG. 1 (e.g., first reflector plate 905a of FIG. 9 and/or second reflector plate 905b of FIG. 9) can be moved to facilitate eavesdropping on enemy communication and/or to obtain an enemy position. In one embodiment, the reflector 105 of FIG. 1 can cause more than one signal to be reflected to and/or away from the collection antenna 110 of FIG. 1.

It is to be appreciated by one of ordinary skill in the art that references to one item in one figure is not limiting to that embodiment. For example, a reference to the collection antenna 110 of FIG. 1 can also be applied to the collection antenna 110 of FIG. 2.

What is claimed is:

1. A system, comprising:
   a collection antenna;
   a reflector configured to reflect a designated signal to the collection antenna and configured to reflect a non-designated signal away from the collection antenna; and
   a shield configured to prevent the designated signal from directly reaching the collection antenna and configured to prevent the non-designated signal from directly reaching the collection antenna
   where the shield comprises a tile section and a cone section,
   where the tile section is configured to prevent the designated signal from directly reaching the collection antenna when the designated signal is within a first frequency range,
   where the cone section is configured to prevent the designated signal from directly reaching the collection antenna when the designated signal is within a second frequency, and
   where the first frequency range and second frequency range are different.

2. The system of claim 1, comprising:
   an antenna array configured to determine a direction from a source of the designated signal,
   where the reflector is moved to a position that causes the designated signal to be reflected to the collection antenna and to reflect the non-designated signal away from the collection antenna and
   where the reflector is moved based, at least in part, on the direction.

3. The system of claim 1, where the designated signal and the non-designated signal are of equal frequency and where the non-designated signal is of greater signal strength than the designated signal.

4. The system of claim 1,
   where the reflector is at least one reflector plate that terminates at opposite ends with an elliptical shape.

5. The system of claim 1,
   where a portion of the at least one reflector plate is flat and where the elliptical shape on each end is a substantially encompassed elliptical shape along a plane.

6. A system, comprising: a plurality of reflector plates configured to reflect a designated signal to a collection antenna and configured to reflect a non-designated signal away from the collection antenna, where the plurality of reflector plates comprises a first reflector plate and a second reflector plate; and a radio frequency shield configured to prevent the designated signal from directly reaching the collection antenna and to prevent the non-designated signal from directly reaching the collection antenna, where the shield is disposed between the first reflector plate and the second reflector plate; and an antenna array configured to determine a direction of a source of the designated signal; and a mechanism configured to cause the plurality of reflector plates to be positioned to a position such that a reflective portion of the plurality of reflector plates reflect the designated signal from the source to the collection antenna, where a determination of the position is based, at least in part, on the direction of the source, where the collection antenna comprises a radio frequency guard, where individual reflector plates of the plurality of reflector plates terminate at opposite ends with an elliptical shape, and where an angle the designated signal intersects with the plurality of reflector elates and an angle of the plurality of reflector plates to the collection antenna are used to determine the position.

7. The system of claim 6, where the position is selected through a trial and error method.

8. The system of claim 6,
   where the first reflector plate terminates at opposite ends with an elliptical shape.

9. The system of claim 8,
   where the second reflector plate terminates at opposite ends with an elliptical shape.

10. The system of claim 6,
where at least a portion of the first reflector plate is flat.

11. The system of claim 10,
where at least a portion of the second reflector plate is flat.

12. The system of claim 6,
where the radio frequency shield comprises a tile section and a cone section,
where the tile section is configured to prevent the designated signal from directly reaching the collection antenna when the designated signal is within a first frequency range,
where the cone section is configured to prevent the designated signal from directly reaching the collection antenna when the designated signal is within a second frequency, and
where the first frequency range and second frequency range are different.

13. The system of claim 6,
where the plurality of reflector plates is two reflector places.

14. The system of claim 6,
where the plurality of reflector plates is more than two reflector places.

15. A system, comprising:
a collection antenna;
a reflector configured to reflect a designated signal to the collection antenna and configured to reflect a non-designated signal away from the collection antenna; and
an antenna array configured to determine a direction from a source of the designated signal;
a shield configured to prevent the designated signal from directly reaching the collection antenna and configured to prevent the non-designated signal from directly reaching the collection antenna,
where the reflector is moved to a position that causes the designated signal to be reflected to the collection antenna and to reflect the non-designated signal away from the collection antenna,
where the reflector is moved based, at least in part, on the direction,
where the reflector is at least one reflector plate that terminates at opposite ends with an elliptical shape, and
where the collection antenna comprises a radio frequency guard.

16. The system of claim 15,
where the shield comprises a tile section and a cone section,
where the tile section is configured to prevent the designated signal from directly reaching the collection antenna when the designated signal is within a first frequency range,
where the cone section is configured to prevent the designated signal from directly reaching the collection antenna when the designated signal is within a second frequency, and
where the first frequency range and second frequency range are different.

17. A system, comprising:
a collection antenna; and
a reflector configured to reflect a designated signal to the collection antenna and configured to reflect a non-designated signal away from the collection antenna;
where the reflector is at least one reflector plate that terminates at opposite ends with an elliptical shape,
where the reflector comprises a signal reflective side and a signal absorbent side, where the signal reflective side is more signal reflective than the signal absorbent side,
where the signal absorbent side is more signal absorbent than the signal reflective side,
where the opposite ends with the elliptical shape turn toward the signal absorbent side,
where a portion of the at least one reflector plate is flat, and
where the elliptical shape on each end is a substantially encompassed elliptical shape along a plane.

18. The system of claim 17, comprising:
a shield configured to prevent the designated signal from directly reaching the collection antenna and configured to prevent the non-designated signal from directly reaching the collection antenna.

19. The system of claim 18,
where the shield comprises a tile section and a cone section,
where the tile section is configured to prevent the designated signal from directly reaching the collection antenna when the designated signal is within a first frequency range,
where the cone section is configured to prevent the designated signal from directly reaching the collection antenna when the designated signal is within a second frequency, and
where the first frequency range and second frequency range are different.

* * * * *